(12) United States Patent
Boger et al.

(10) Patent No.: US 6,970,616 B2
(45) Date of Patent: Nov. 29, 2005

(54) OPTICAL CROSS-CONNECT ASSEMBLY

(75) Inventors: David Boger, Redondo Beach, CA (US); Rob Dueck, Santa Ana, CA (US); Ratfi Garabedian, Monrovia, CA (US); Mike Rud, Calabasas, CA (US)

(73) Assignee: Touchdown Technologies, Inc., Baldwin Park, CA (US)

( * ) Notice: Subject to any disclaimer, the term of this patent is extended or adjusted under 35 U.S.C. 154(b) by 286 days.

(21) Appl. No.: 10/102,602

(22) Filed: Mar. 19, 2002

(65) Prior Publication Data

US 2002/0176654 A1 Nov. 28, 2002

Related U.S. Application Data

(60) Provisional application No. 60/277,047, filed on Mar. 18, 2001.

(51) Int. Cl.[7] .............................................. G02B 6/26
(52) U.S. Cl. ..................................................... 385/17
(58) Field of Search .................. 356/73.1; 385/16–18, 385/20–22, 12, 47, 140; 250/214 SW, 227.22, 250/227.14, 227.21

(56) References Cited

U.S. PATENT DOCUMENTS

| | | |
|---|---|---|
| 5,327,033 A | 7/1994 | Guckel et al. |
| 5,412,265 A | 5/1995 | Sickafus |
| 5,472,539 A | 12/1995 | Saia et al. |
| 5,659,195 A | 8/1997 | Kaiser et al. |
| 5,808,384 A | 9/1998 | Tabat et al. |
| 6,087,747 A | 7/2000 | Dhuler et al. |
| 6,094,293 A | 7/2000 | Yokoyama et al. |
| 6,097,859 A | 8/2000 | Solgaard et al. |
| 6,121,983 A | 9/2000 | Fork et al. |
| 6,122,149 A | 9/2000 | Zhang et al. |
| 6,124,650 A | 9/2000 | Bishop et al. |
| 6,144,781 A | 11/2000 | Goldstein et al. |
| 6,166,478 A | 12/2000 | Yi et al. |
| 6,166,863 A | 12/2000 | Ohtake |
| 6,181,460 B1 | 1/2001 | Tran et al. |
| 6,628,857 B1 * | 9/2003 | Bonadeo et al. .............. 385/18 |
| 2001/0024548 A1 * | 9/2001 | Hamanaka et al. ........... 385/33 |

OTHER PUBLICATIONS

Lin et al, Micro-Electro-Mechanical Systems (MEMS) for WDM Optical-Crossconnect Networks, Oct. 31-Nov. 3, 1999, IEEE, vol. 2, pp.: 954-957.*

* cited by examiner

Primary Examiner—Tu T. Nguyen
(74) Attorney, Agent, or Firm—Liu & Liu

(57) ABSTRACT

The light beams from a collimator array are each aimed at a optical switch array in a converging manner such that the point of convergence of the reflected light beams is at or near the center of a target (e.g., another optical switch array, receiver array, or any other space in which light beams are to be directed). The light beams converge at an imaginary common point behind the plane of the mirrors, at a distance along an optical axis from the mirrors, which is substantially equal to the distance along an optical axis between mirror arrays.

21 Claims, 17 Drawing Sheets

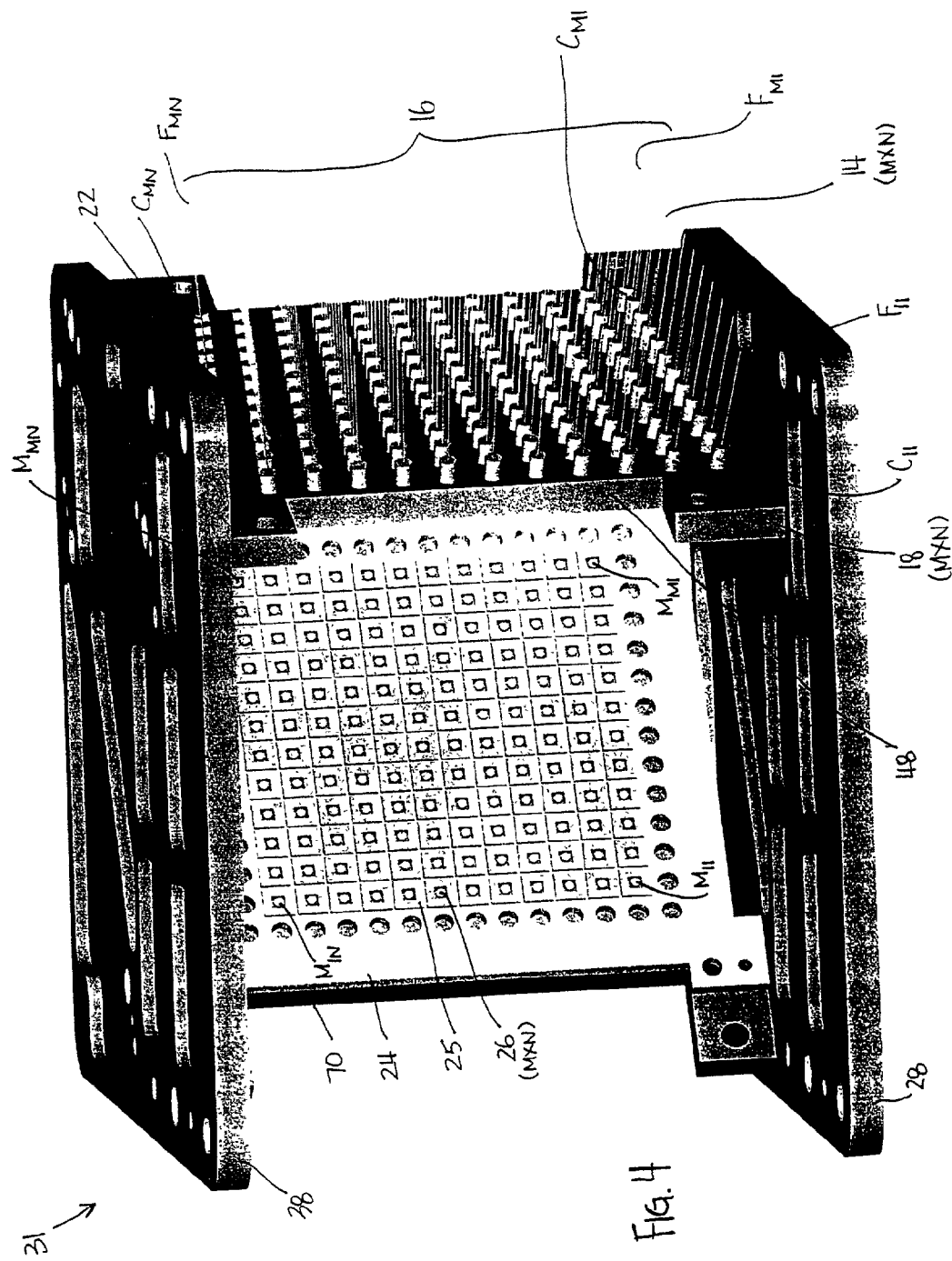

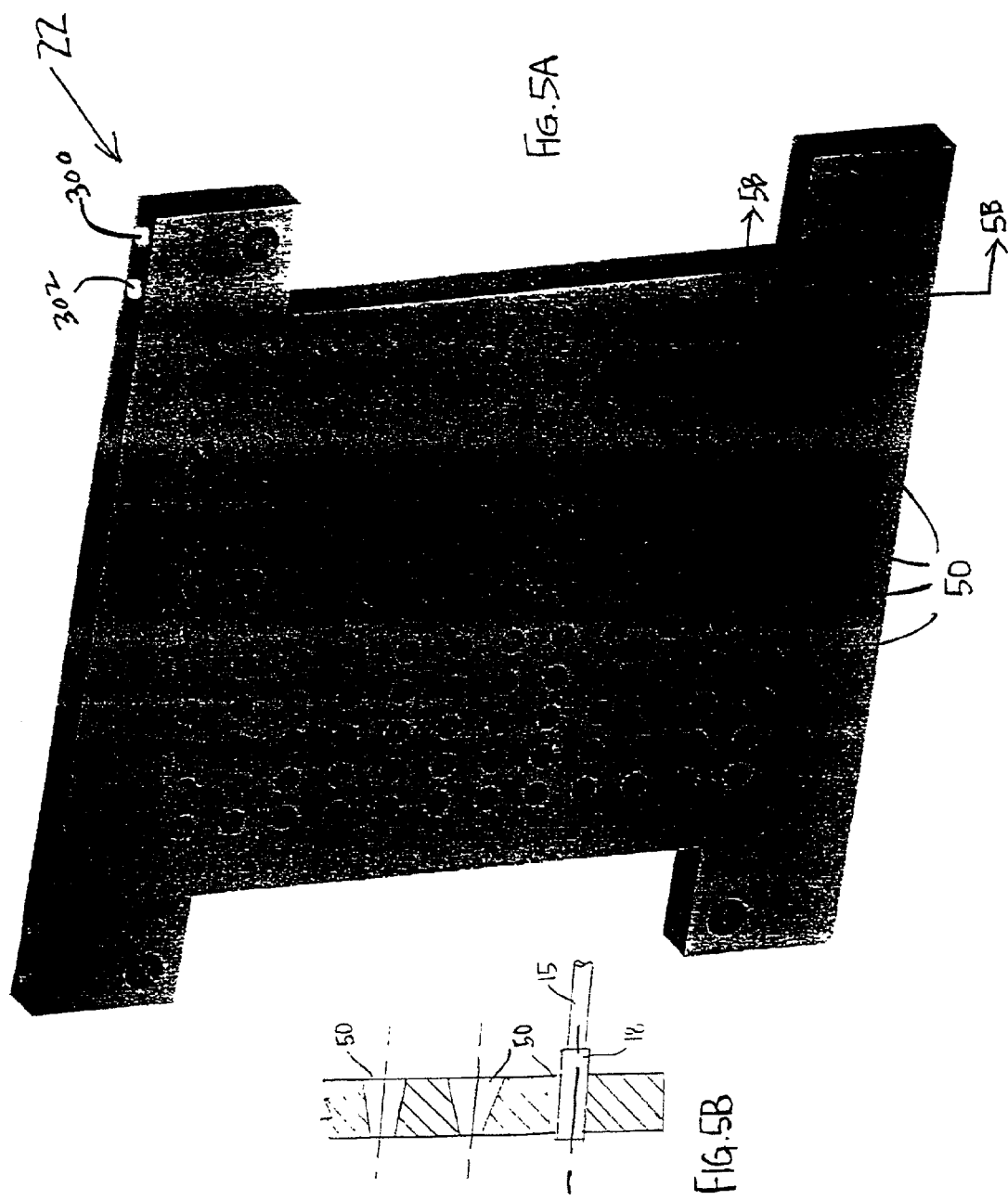

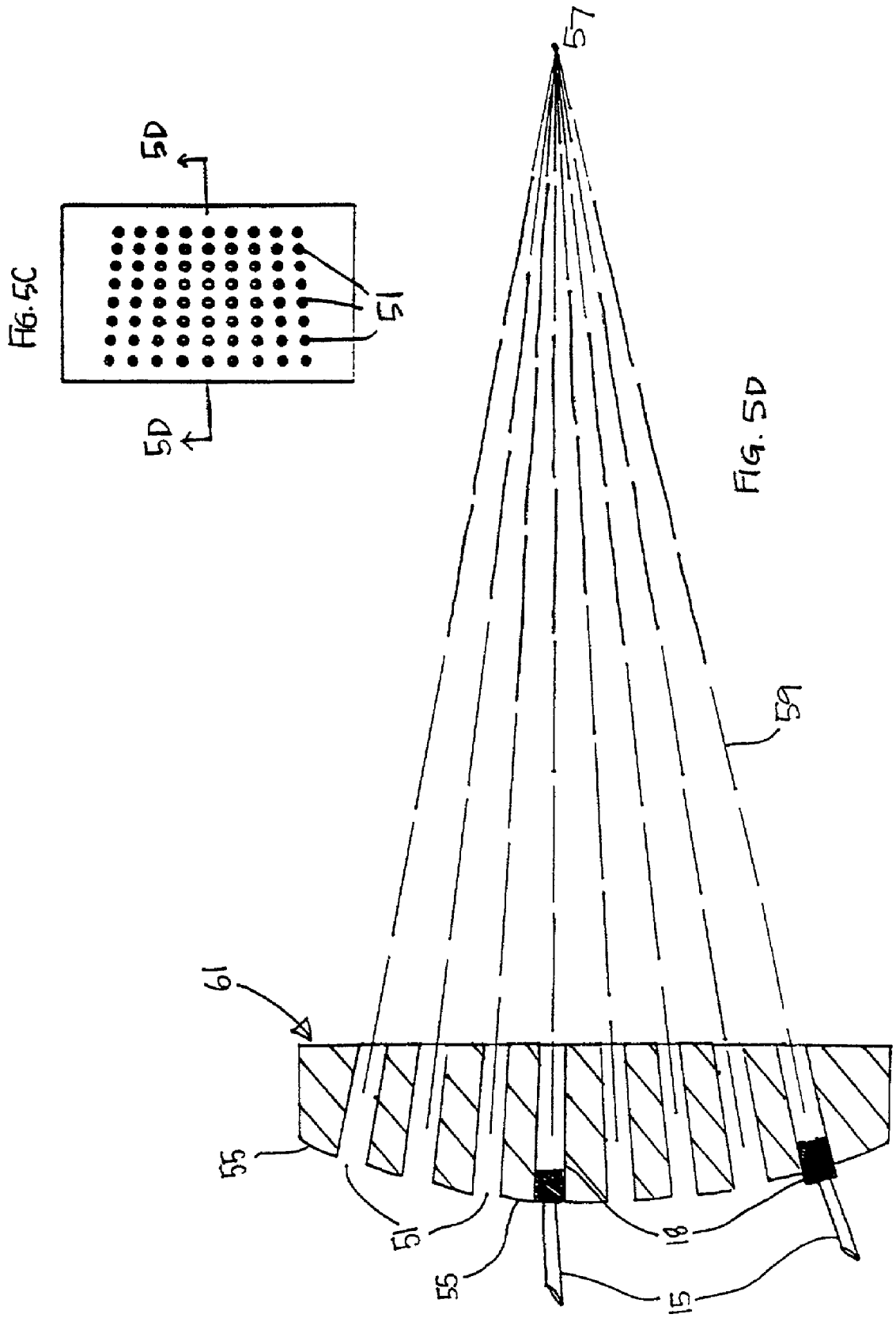

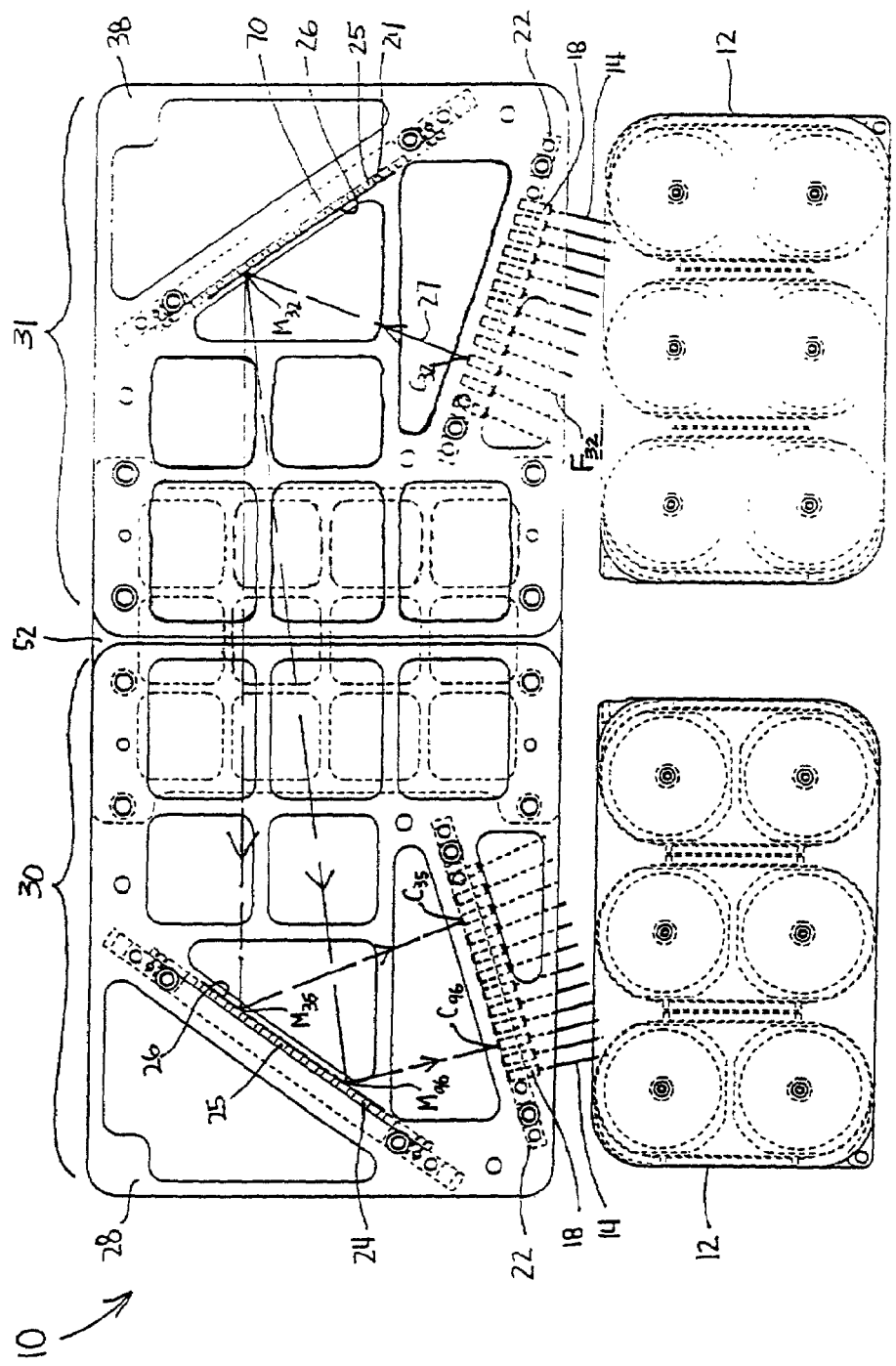

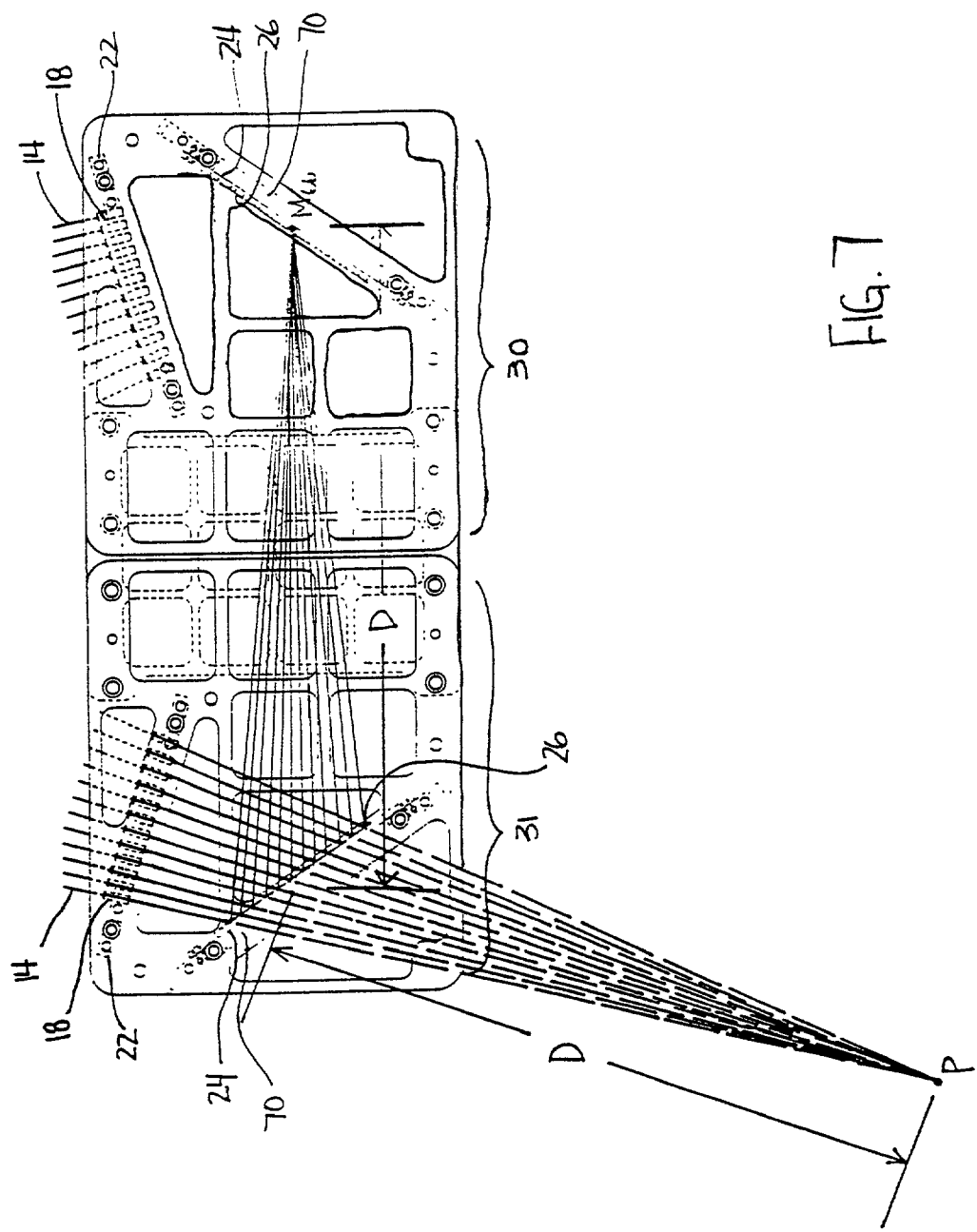

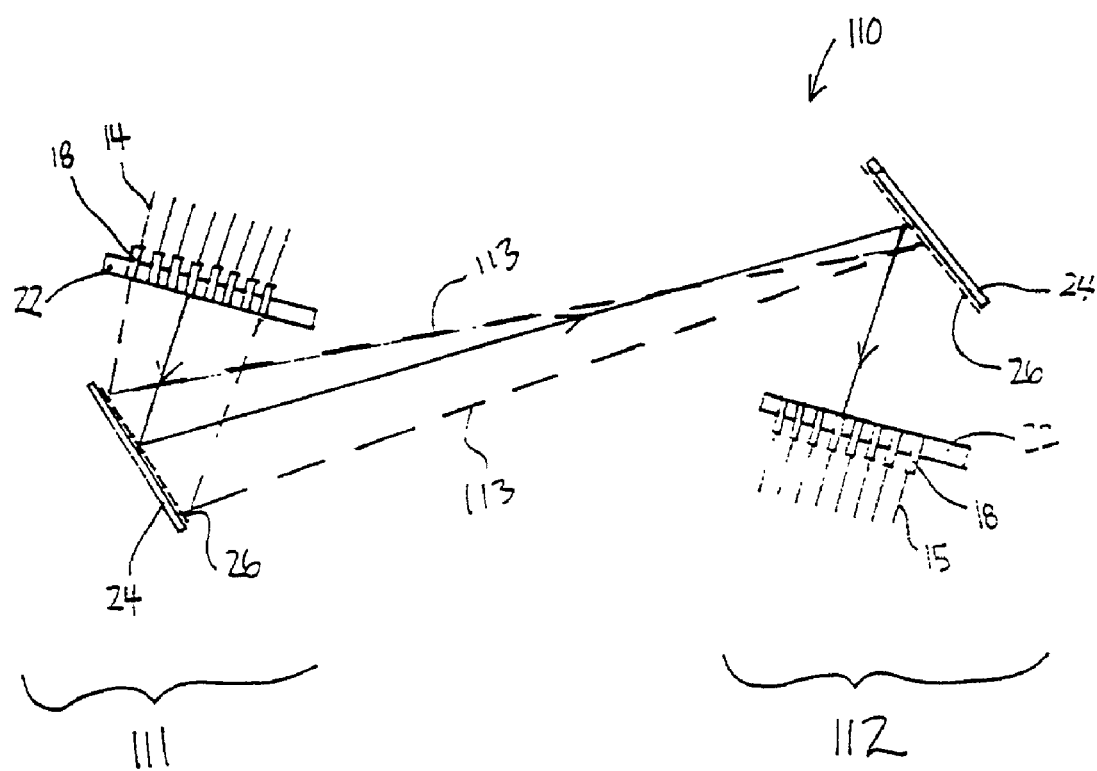
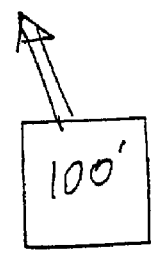
FIG. 11

OPTICAL CROSS-CONNECT ASSEMBLY

This application makes a claim of priority from co-pending U.S. application Ser. No. 10/102,407 entitled "Position Sensor and Controller For A MEMS Device And Incorporation Thereof Into An Optical Device", filed Mar., 18, 2002 in the name of O'Hara Et al, said application being hereby incorporated by reference as if fully set forth herein; co-pending U.S. Application Ser. No. 10/036,769, entitled "Moving Coil Motor And Implementations In MEMS Based Optical Switches", filed Nov. 8, 2001 in the names of Temesvary et. Al, said application being hereby incorporated by reference as if fully set forth herein; co-pending U.S. application Ser. No. 10/102,142 entitled "Distributive Optical Switching Control System", filed Mar., 19, 2002 in the name of Bhat Et al, said application being hereby incorporated by reference as if fully set forth herein; and co-pending U.S. application Ser. No. 10/102,601 entitled "System And Method For Optimizing Optical Coupling,"filed Mar., 19 2002 in the name of Bhat Et al, said application being hereby incorporated by reference as if fully set forth herein; all of which are commonly assigned to Integrated Micromachines, Inc., the assignee of the present invention.

BACKGROUND OF THE INVENTION

1. Field of the Invention

The present invention relates to the field of optical switching. More specifically, the present invention relates to the assembly and packaging of optical switches in an optical cross-connect assembly.

2. Background of Design Considerations

Fiber optic networks transmit optical signals to communicate data within the network. The optical communication signals are transmitted across the networks through a system of optical fibers and optical cross-connect systems. The optical fibers demonstrate a significantly higher bandwidth data transmission capacity and lower signal losses compared to copper wires.

The present invention relates to an optical cross-connect system having optical switches based on micromachines. Micromachines are small electromechanical devices that are fabricated on wafers of silicon and other materials utilizing semiconductor manufacturing techniques. Optical switches in micro-electromechanical systems (MEMS) employ micro-mirrors that are etched onto silicon wafers. Such optical switches are commonly used in fiber-optic networks, which route data carrying light signals between an input and an output. The micro-mirrors typically include an actuator (e.g., a drive motor) that is selectively moves a blocking/reflecting member (e.g., a mirror) between different inputs and outputs, thereby performing the optical switching function. In a fiber optic network, the mirrors can be positioned to block, pass, or reflect (redirect) incoming light beams that are conveyed via individual strands of optical fiber at the inputs to output receivers (e.g., receiving optic fibers). Alternatively in some optical switches, the mirrors can be pivoted to direct the input light beams at a desired angle to the receivers.

In the optical network system, a collimator is provided at the end of each optic fiber, with collimator being mounted or supported in alignment with the specific mirror in the optical switch. To increase the switching capacity of light signals in the network from multiple inputs to multiple output receivers, a number of optical switches are configured in a planar matrix or array to handle switching of data. As the number of channels increases, the number of optical switches increases accordingly. The assembly of optical switches and optic fibers to handle multi-output switching is often referred to as an optical cross-connect.

While fiber optic network systems improve data bandwidth and losses compared to conventional copper wired network, fiber optic network systems pose many new challenges in the design and engineering of the systems. One of the design objectives for an optical cross-connect is to be able to optically connect any input to any output of the cross-connect. To achieve this, the mirrors in each optical switch must be enabled to physically tilt within adequate range to redirect input light signals to any of the output receivers. It can be appreciated that as the number of optical switches and inputs and outputs increases, each mirror needs to be provided with a larger range or angle of motion to serve all the outputs, or the form factor or footprint of the cross-connect assembly must be increased (e.g., increasing the distance between transmitting and receiving mirror arrays) to accommodate the angle limitation of the mirrors in an effort to cover the large span of outputs. For practical applications, there is a limit to the form factor of the cross-connect assembly in installations of the optical network. The limited range of motion of the mirror puts a limitation on the switching capacity of the cross-connect (i.e., puts a limit on the number of optical switches and inputs and outputs that can be configured in an optical cross-connect.) The size of the cross-connect cannot be simply scaled by adding more optical switches. Companies are trying to increase the switching capacity by developing MEMS based optical switches having mirrors with an increased range of motion. The successful development of high capacity optical cross-connect has been limited in part by the development costs, and the structural limitation of the MEMS devices limits.

Further, it is a disadvantage if the mirrors in an array of optical switches are not optimized to maximize the switching coverage within the limits of motion for each mirror. Some of the mirrors may not utilize the full range of motion to cover the possible range of output space; some of the mirrors may be substantially utilized to the limit in one direction and relatively less utilized in the other direction. The unutilized range of the mirrors is in essence wasted resource in the optical cross-connect. If the otherwise unutilized range may be effectively utilized, the overall form factor of the cross-connect assembly may be reduced for a given optical switch array design, or the span of the output receivers may be increased for a given form factor, or the optical switches can adopt a design with a smaller range of motion for a given array size, thus potentially reducing development costs.

It is therefore desirable to develop a configuration of the optical cross-connect that improves switching capacity for a given optical switch design and given limit of mirror motion.

It has been also a challenge to configure the assembly and packaging of optical switches in an optical cross-connect to facilitate coupling of the optic fibers/collimators with respect to the optical switches. For example, the coupling of optic fibers/collimators with the mirrors requires tight tolerances. As the switching capacity of an optical cross-connect increases, the task of aligning the large number of optic fibers/collimators with the mirrors in the switches becomes increasingly more difficult.

It is therefore also desirable to develop a reliable configuration of the optical cross-connect assembly for a large array of optical switches to facilitate optical alignment of the optic fibers and collimators.

SUMMARY OF THE INVENTION

The present invention provides a novel configuration that optimizes the coverage (i.e., the angular displacement) of each mirror in the array of optical switches, by strategically positioning the mirror arrays and in an fiber/collimators orientation that optimizes the usage of mirrors for a given range of mirror motion, and simplifies mounting and alignment of the optic fibers/collimators optics with respect to the mirrors in the optical switch array.

In one aspect of the present invention, the optical cross-connect comprises at least two arrays of optical switches working in conjunction to switch optical signals. Each array of optical switches is associated with a set of optic fibers/collimators. The arrays are positioned with respect to one another, in such geometrical arrangement (e.g., in an oblique opposing manner) that each optical switch array can deflect input light beams to the other optical switch array, which acts as an array of output receivers, receiving the deflected light beams.

In another aspect of the present invention, the light beams from the optic fibers/collimators are each aimed at a mirror in the array, and in a converging manner. Further the point of convergence of the reflected light beams is at or near the center of a target (e.g., another optical switch array, receiver array, or any other space in which light beams are to be directed). In one embodiment in which the present invention involves the optical cross-connect assembly, the light beams converge at an imaginary common point behind the plane of the mirrors, at a distance (along an optical axis) from the mirrors, which is substantially equal to the distance (along an optical axis) between mirror arrays. In another embodiment of the present invention in which first and second arrays of optical switches are deployed, the optic fibers/collimators are supported with respect to their associated mirror array, with each fiber/collimator aimed in a direction whereby the light beams from each set reflected from the mirrors (in their respective nominal unbiased position) in the array would substantially converge with respect to the mirror at or near the center of the other optical switch array. According to optical geometry, the light beams from each set of optic fibers/collimators would converge at an imaginary common point behind the set of mirrors in the associated array, whereby the distance along an optical axis of the imaginary convergence point from the mirrors is substantially the same as the distance along an optical axis between the convergence point at the center mirror in the other array and the mirrors in said associated array.

In another aspect of the present invention, light beams may be aimed at the mirrors in a converging manner by physically aligning optic fiber/collimator with respect to the mirrors. According to one embodiment of the present invention, a collimator is coupled to the end of each optic fiber. The collimators are mounted on a collimator support plate, each at an angle in a direction aimed at the mirrors in the associated optical switch array and in such converging manner. In one embodiment, the collimator plate has support holes arranged in a matrix that is generally trapezoidal shaped, for a generally rectangular array of optical switches.

In a further aspect of the present invention, instead of physically mounting the collimators in a direction to aim light beams in a converging manner, an optical element, such as a lens (e.g., a plano-convex lens) is provided to bias the lights beams from a parallel array of collimators in a converging manner towards their associated optical switch array. The collimated light beams are refracted towards the optical axis as they travel through the planar face of the lens and the convex face of the lens, consequently converging the bundle of light beams.

According to another embodiment of the present invention, there is provided a slight divergence in the light beam that enters the collimator. The slight divergence in the light will be "corrected" by the focusing effect of the plano-convex lens. The slight divergence in the light beam may be obtained by relative positioning of the optic fiber with respect to the collimator, in accordance with one embodiment of the present invention.

In yet another aspect of the present invention, collimator-mounting sockets are provided in the collimator support plate to allow the collimators to swivel in aiming the collimators at the mirrors. In one embodiment, the sockets are axial symmetrical conical shaped through-holes provided in a collimator plate, and the collimators have a cylindrical external wall. The axes of the sockets are along a direction that converges as noted above. The cylindrical wall of the collimator can swivel within the conical hole in directions about the axis of the sockets. Once a collimator is aimed at the desired direction, its position relative to the collimator plate is secured, for example by applying an epoxy or welding.

According to another embodiment of the present invention, there is provided a modified optical cross-connect assembly configuration in which the optical switch arrays are positioned with their planes at an acute angle to each other.

In a further aspect of the present invention, an alignment array is designed to facilitate alignment of the collimators on the collimator plate.

In another aspect of the present invention, a modular support structure is designed for deployment of the cross-connect assemblies.

The above, as well as additional objects, features, and advantages of the present invention will become apparent in the following detailed written description.

BRIEF DESCRIPTION OF THE DRAWINGS

For a fuller understanding of the nature and advantages of the present invention, as well as the preferred mode of use, reference should be made to the following detailed description read in conjunction with the accompanying drawings. In the following drawings, like reference numerals designate like or similar parts throughout the drawings.

FIG. 4 is a side perspective view showing a subassembly of one half of the optical cross-connect assembly of FIG. 3, with one mirror plate and one collimator plate.

FIG. 5A is a perspective view of the collimator plate according to an embodiment of the present invention; FIG. 5B is a sectional view taken along line 5B—5B in FIG. 5A, showing the conical collimator mounting sockets; FIG. 5C is a top view of the collimator plate according to another embodiment of the present invention; FIG. 5D is a sectional view taken along line 5D—5D in FIG. 5C, showing the convex collimator plate with mounted collimators.

FIG. 6 is top view of the optical cross-connect assembly of FIG. 2.

FIG. 7 is a schematic of the optical cross-connect assembly of FIG. 2, illustrating the convergence light beams.

FIG. 11 is a schematic of the relative positioning of the collimator plates and mirror plates according to another embodiment of the present invention.

DETAILED DESCRIPTION OF THE PREFERRED EMBODIMENT

This invention is described in the following description with reference to the drawings. While this invention is described in terms of the best mode for achieving this invention's objectives, it will be appreciated by those skilled in the art that variations may be accomplished in view of these teachings without deviating from the, spirit or scope of the invention. This description is made for the purpose of illustrating the general principles of the invention and should not be taken in a limiting sense. The scope of the invention is best determined by reference to the appended claims.

Various MEMS-based devices, their fabrication, and their use in optical systems are variously described in the following U.S. Patents, each of which is hereby incorporated by reference as if fully set forth herein: U.S. Pat. No. 6,181,460 to Tran et al; U.S. Pat. No. 5,412,265 to Sickafus; U.S. Pat. No. 5,472,539 to Saia et al; U.S. Pat. No. 5,808,384 to Tabat et al; U.S. Pat. No. 6,094,293 to Yokoyama et al; U.S. Pat. No. 6,166,478 to Yi et al; U.S. Pat. No. 6,124,650 to Bishop et al; U.S. Pat. No. 6,122,149 to Zhang et al; U.S. Pat. No. 6,166,863 to Ahn et al; U.S. Pat. No. 6,087,747 to Dhuler et al; U.S. Pat. No. 5,327,033 to Guckel et al; U.S. Pat. No. 6,144,781 to Goldstein et al; U.S. Pat. No. 6,121,983 to Fork et al; U.S. Pat. No. 5,659,195 to Kaiser et al. MEMS devices and their application to optical systems is described in Office of Naval Research Publication No. NRL/MR/6336-99-7975 dated May 15, 1999, entitled "Optics and MEMS", authors Steven J. Walker and David J. Nagel. Said publication is hereby incorporated by reference as if fully set forth herein.

Figure 1:
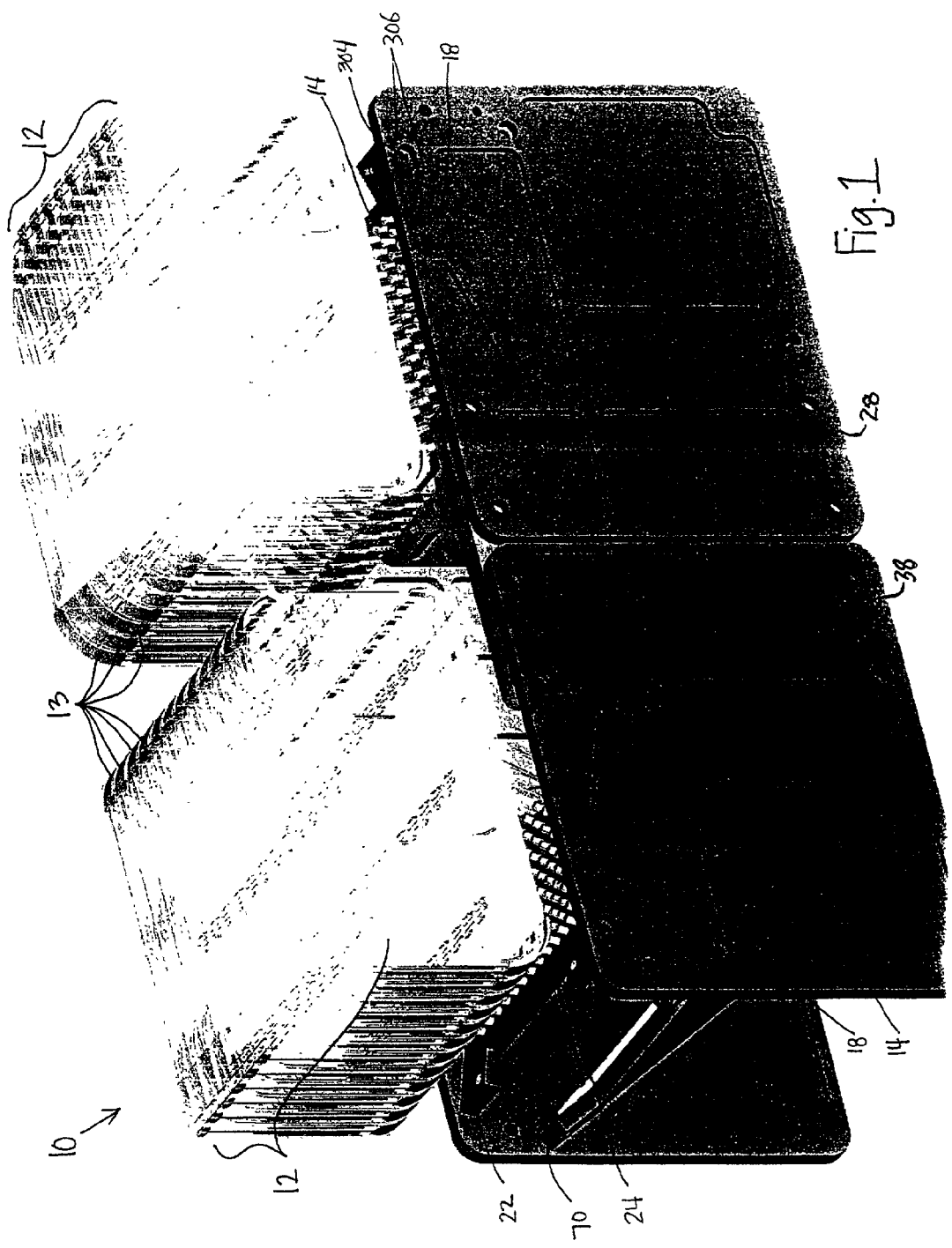
FIG. 1 is a perspective view of one orientation of the optical cross-connect assembly with fiber tray assembly attached, in accordance with one embodiment of the present invention.
Figure 2:
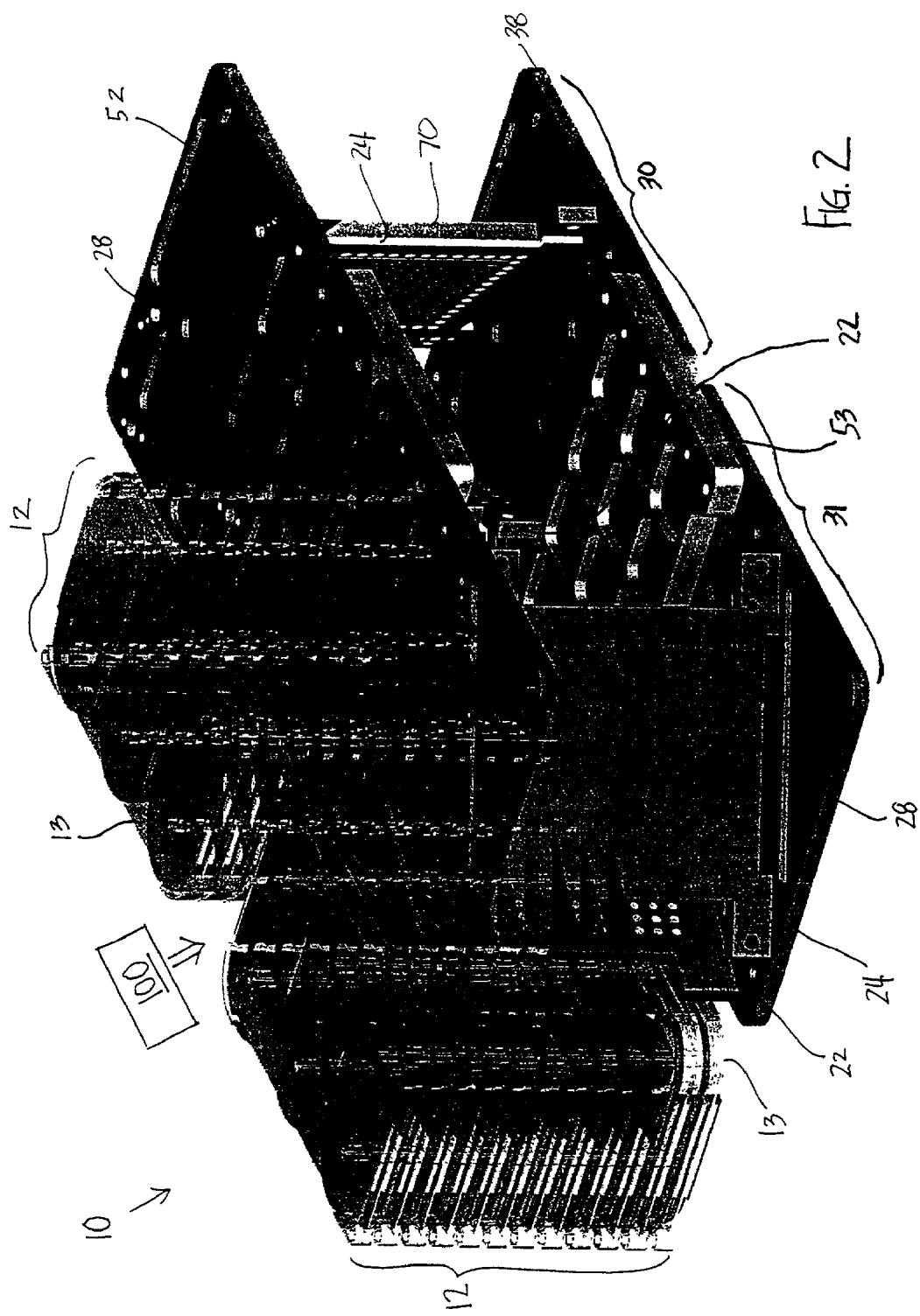
FIG. 2 is a perspective view of another orientation of the optical cross-connect assembly of FIG. 1 lying on one side of the mounting plates.
Figure 3:
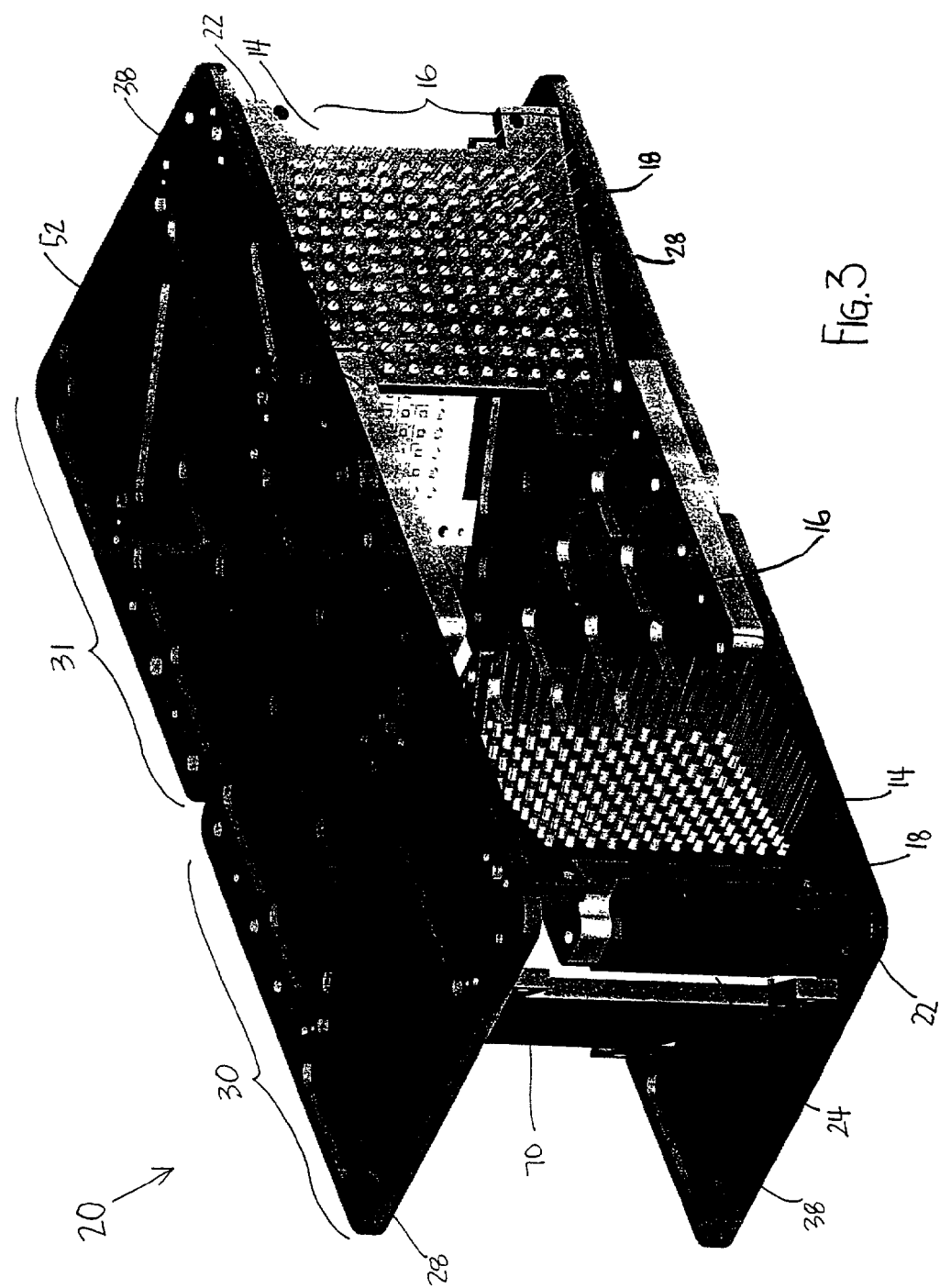
FIG. 3 is another perspective view of the optical cross-connect assembly of FIG. 2, with the fiber tray assembly removed, showing more clearly the placement of the mirror plates and collimator plates.

FIGS. 1 to 3 illustrate the multi-port optical cross-connect assembly 10 in accordance with one embodiment of the present invention in different orientations. The optical cross-connect assembly 10 generally comprises two subassemblies 30 and 31, which are coupled by joining plates 52 and 53. Referring also to FIG. 4, the subassemblies 30 and 31 are substantially identical, but arranged in the cross-connect assembly 10 in symmetry about the coupling location (or mirror image to each other). As shown in FIG. 3, the subassembly 30 is oriented upside down with respect to subassembly 31, in a mirror image of each other, to form the symmetrical cross-connect assembly 10. The subassemblies 30 and 31 each comprises mounting plates 28 and 38, which together support a collimator plate 22 and an optical switch support plate 70. The collimator plate 22 supports an array of collimating optics such as collimating lenses configured as collimators 18, to which the ends of optic fibers 14 in a bundle/array 16 are coupled. In the embodiment illustrated, there are 12×12 optic fibers 14/collimators 18 in a planar M×N array that is in a generally trapezoidal shape. The trapezoidal configuration of the array is described below in connection with FIG. 5.

The optical switch support plate 70 supports an array of MEMS based optical switches 25, which may be configured in plate 24. Each switch 25 has a mirror 26 that can be driven to pivot, tip, tilt, rotate or otherwise move about at least two axes in the plane of the array. The optical switches 25 may have a structure as in the embodiments disclosed in the concurrently filed, co-pending U.S. Provisional Application No. 60/277,135 entitled "Lorentz Motor And Implementations In MEMS-Based Optical Switches", filed Mar. 18, 2001 in the names of Temesvary et. al, which is commonly assigned to Integrated Micromachines, Inc., the assignee of the present invention. This application is fully incorporated by reference herein.

In the illustrated embodiment, the optical switches are arranged in a rectangular M×N planar array, more specifically a 12×12 square planar matrix (i.e., M=N). Other array configurations (e.g., any M×N rectangular arrays, or arrays of other regular or irregular geometries, such as trapezoidal, hexagonal, circular, line, planar, convex, concave, three-dimensional surfaces, etc.) may be adopted without departing from the scope and spirit of the present invention.

In the embodiment shown, in each subassembly 30/31, the collimator plate 22 and the optical switch support plate 24 are positioned with their planes at an acute angle. The collimator plate 22 and the optical switch support plate 24 are attached to the mounting plate 28/38 by pins, bolts, rivets and the like. The collimator plates 22, the optical switch plates 25, the mounting plates 28 and 38 and the joining plate 52 and 53 are preferably made of Kovar. Other reasons for choosing Kovar as the material for the optical cross-connect assembly include low coefficient of thermal expansion, good structural integrity, and laser weldability. Thermal stability is important to maintain optical alignment of the various components. By choosing the same material for these three plate components, there is greater compatibility in coefficient of thermal expansion for these three components. Also, the coefficient of thermal expansion of Kovar is close to that of silicon, which makes it a desirable material for supporting the MEMS optical switches 25. The use of this particular material is by way of example, which does not deviate from the spirit or scope of the invention, and should not be taken in a limiting sense.

The collimator plates 22, the optical switch plates 25, the mounting plates 28 and 38 and the joining plate 52 and 53 are preferably assembled to form the cross-connect assembly 10 by locating and/or alignment pins and bolts. For example, referring to FIG. 1 and FIG. 5A, it can be seen that tapped holes 302 and cylindrical holes 300 are provided on the attaching surfaces of the collimator plate 22, and countersunk bolt head holes 304 and cylindrical holes 306 are provided on the mounting plates 28 and 38. The cylindrical holes 300 and 306 receives location/alignment pins (not shown) when the components are assembled. A bolt is bolted to the tapped hole 302 via the countersunk bolt head hole 304. Similar attachments provided between the switch support plate 70 and the mounting plates 28 and 38. This allows for manufacturability of the system, in which common tooling are utilized to enable repeatable critical alignment of the components during assembly. The components are made with same tooling, processes, etc., facilitating easy replacement of failed components in the field, and often without the need for realignment of the optics.

A fiber management system is provided to take up the slack and efficiently, neatly, and systematically store the extra or "reserved" lengths of optic fibers 14 leading to the collimators 18. The fiber management system comprises fiber tray assemblies 12, each comprising a stack of fiber trays 13 pivotally mounted with respect to the cross-connect assembly 10.

Referring to FIG. 6, the optical path of the cross-connect 10 will be explained. Each optic fiber 14 terminates at a collimator 18. Each fiber 14 is associated with a single mirror 26 in the array of switches 25, and vice versa, in the same subassembly. Specifically, the fiber 14 in subassembly 30 are mutually associated with respective mirrors 26 in the array of switches 25 in subassembly 30, and the fibers 14 in subassembly 31 are mutually associated with respective mirrors 26 in the array of switches 25 in subassembly 31. More specifically in the illustrated embodiment in FIG. 6, for each subassembly 30 and 31, each collimator 18 is aimed at its associate mirror 26 in generally one-to-one correspondence (in the planar space) between the arrays of switches 25 and the array of collimators 14 (i.e., optic fibers $F_{ij}$ and collimators$_{ij}$ correspond to mirror$_{ij}$ in an M×N array; $1<i<M$ and $1<j<N$; see also FIG. 4). By way of example, input light beam 27 carrying optical data signals via fiber $F_{32}$ to collimator $C_{32}$ is aimed at mirror $M_{32}$ in subassembly 31, which can be deflected by movement of the mirror to any of the mirrors 26 in the M×N matrix in subassemblies 30. For example, the light beam 27 may be deflected to mirror $M_{35}$ or $M_{96}$ in subassembly 30. The light beam 27 is then deflected by mirror $M_{35}$ or $M_{96}$ to respective collimator $C_{35}$ or $C_{96}$.

The cross-connect illustrated in FIG. 6 is substantially symmetrical between the two subassemblies 30 and 31, both structurally and optically. Light beams from the fibers 14 in subassembly 30 can be directed at the switches 25 in the other subassembly 31, and vice versa. Depending on the optical signal transmission protocols and/or controls, optical signals may be transmitted bi-directionally and concurrently or sequentially, in an installation for optical switching in an optical network. While the cross-connect assembly 10 is structurally capable of directing light signals in either direction, there may be deployments in which optical signals will be directed from one subassembly to another in the same direction. In which case, one subassembly would function as the receiver of the output of the other subassembly.

The optical cross-connect assembly 10 illustrated is effectively a 144×144 optical cross-connect. That is, optical signals from any of the 144 ports in one subassembly may be transmitted to any of the 144 ports in the other subassembly. Depending on the size of the switch array adopted, larger or small I×J optical cross-connect may be configured.

In practice, there may be extra optical switches and corresponding fiber/collimator combinations that are not normally used or extra optical switches and corresponding fiber/collimator combinations are provided in the cross-connect subassemblies, so as to allow for spare fibers/collimators and switches in reserve for backup use for optical switching in the optical network, in the event an optic switch and/or fiber/collimator malfunctions. The port of the failed switch and/or fiber/collimator can be reassigned to the spare components.

In one aspect of the present invention, to optimize the output coverage of the mirrors 26, the optical cross-connect assembly is configured with the light beams from the optic fibers/collimators each aimed at a mirror in a converging manner. Because the subassemblies 30 and 31 are symmetrical halves of the overall optical cross-connect assembly, the discussion below in connection with subassembly 31 is equally applicable to the other subassembly 30 as well. In one embodiment as illustrated in FIG. 7, the light beams in the subassembly 31 converge at an imaginary common point P behind the plane of the mirrors 26, at a centerline distance D from the mirror array, which is substantially equal to the centerline distance D from the mirror array to the output receivers (i.e., in this case, the optical switch array in subassembly 31). Specifically, the collimators 18 in subassembly 31 are supported, with each fiber/collimator aimed in a direction whereby the light beams reflected from the mirrors 26 in the entire array (at their respective nominal unbiased position with no driving force applied to the mirror) would substantially converge with respect to the mirror at or near the center of the optical switch array in subassembly 30. In the illustrated embodiment, the point of convergence may be at any of the mirrors at or near mirror $M_{66}$.

The collimators 18 in subassembly 30 are configured to converge in a similar fashion.

The optimization of the coverage of the mirrors 26 is based in part on the premise that if all the mirrors in subassembly 31 are aimed at or near the center of the optical switch array in subassembly 30, in their relaxed, nominal unbiased position, then each mirror 26 would be rotating a roughly equal amount, to deflect light beams about the center of the array in the subassembly 30 to cover the entire array. Consider the alternative in which some of the mirrors 26 in subassemblies, in their nominal unbiased positions, are aimed at the mirrors near the boundaries in the other array (e.g., $M_{11}$), then there such mirrors would only need to rotate in one direction during operation, thus leaving the mirrors not fully utilized for the other direction of rotation. In accordance with the present invention, each mirror 26 in subassembly 31 balances the work in all directions of rotation for the mirrors. Accordingly, for a given rotation or angular displacement limit for the mirrors, a larger output coverage may be achieved. Hence, mirrors with smaller rotation limits and/or larger form factors may be deployed for a given output coverage, thus reducing development, design and manufacturing costs. Because the mirrors are optimized for larger output coverage for a given rotation limit, the distance D between the optical switch arrays may be kept to a minimum. Otherwise, without the optimization in accordance with the present invention, the distance D between arrays has to be increased to accommodate a larger coverage for a given mirror rotation limit (i.e., for a given angle of coverage). Optimization of the output coverage would allow a greater number of optical switches to be deploy in the array, thus increasing the switching capacity.

Further, for an optical cross-connect assembly configured in accordance with the present invention, less power is necessary to actuate each mirror for a given optical coupling, and hence the overall system runs on less power. For a given mirror design that are able of large angular displacements, the mirrors do not need to operate at the larger angles, thus the mirrors would undergo less stress and power would be saved.

While the illustrated embodiments refer to opposing mirror arrays, other targets may be deployed instead of another mirror array as target, without departing from the scope and spirit of the present invention. For example, the target for a mirror array may be any regular or irregular planar or three-dimensional area or space of any geometries, to which light beams from the mirror array are directed. The light beams may be aimed at the mirror array in a converging manner at or near the center of the target area or space.

In another aspect of the present invention, light beams may be aimed at the mirrors in a converging manner by physically aligning optic fiber with respect to the mirrors. The collimators are mounted on a collimator support plate, as shown in FIG. 6 for example, each at an angle in a direction aimed at the mirrors in the associated optical switch array and in such converging manner. In one embodiment shown in FIG. 5A, the collimator plate has support holes arranged in a matrix that is generally trapezoidal shaped, for a generally rectangular array of optical switches. The trapezoidal matrix is the result of the angular configuration between the collimator plate 22 and the optical switch plate 24, and the mounting of the collimators 18 to achieve convergence of the collimator beams.

In a further aspect of the present invention, instead of physically mounting the collimators in a direction to aim light beams in a converging manner, an optical element, such as a lens, is provided to bias the lights beams from a parallel array of collimators in a converging manner towards their associated optical switch array. The collimated light beams are refracted towards the optical axis as they travel through the planar face of the lens and the convex face of the lens, consequently converging the bundle of light beams.

Figure 8:
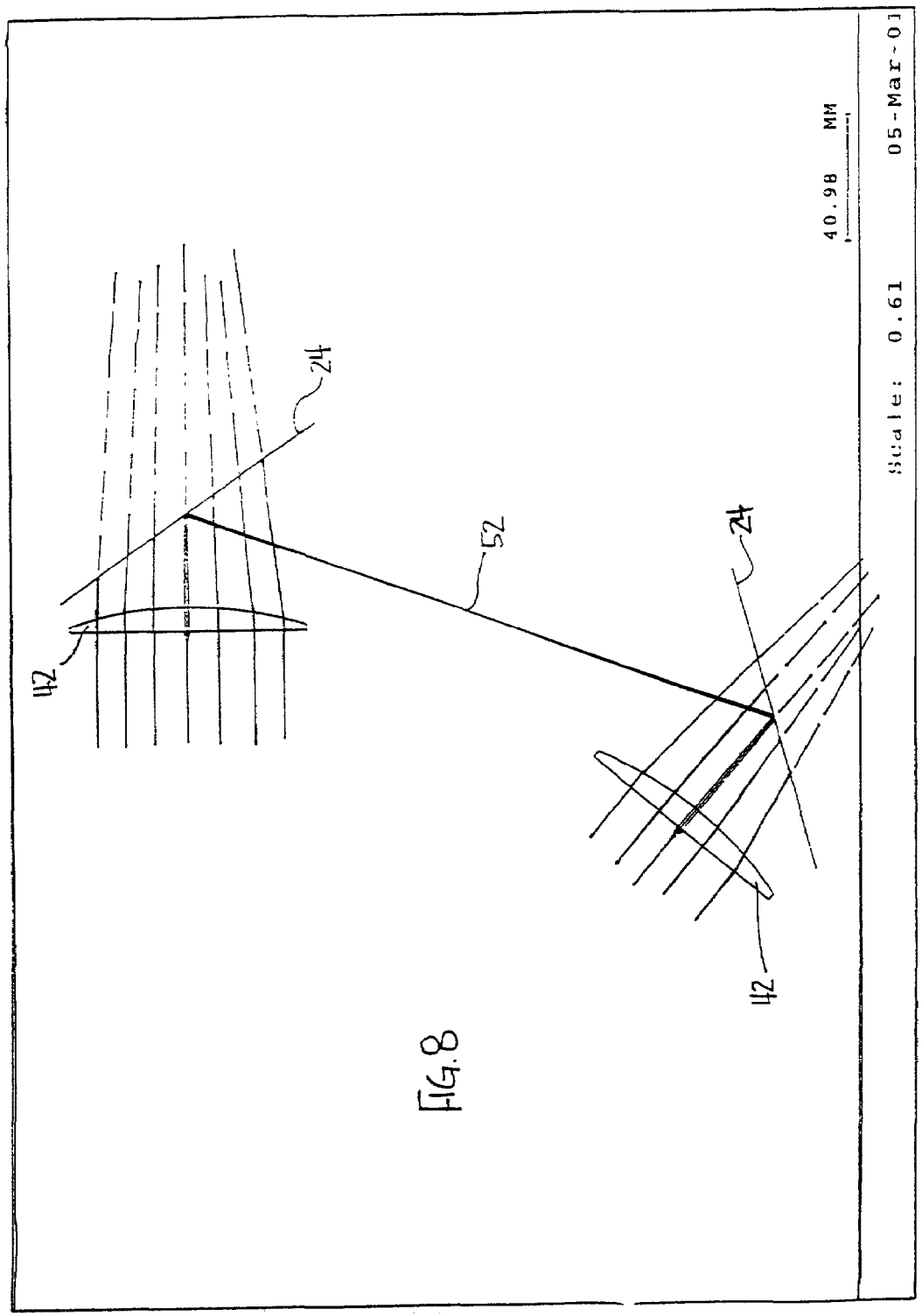
FIG. 8 is a schematic showing the use of a planar convex lens to bias the light beams from collimators to converge according to another embodiment of the present invention.
Figure 9:
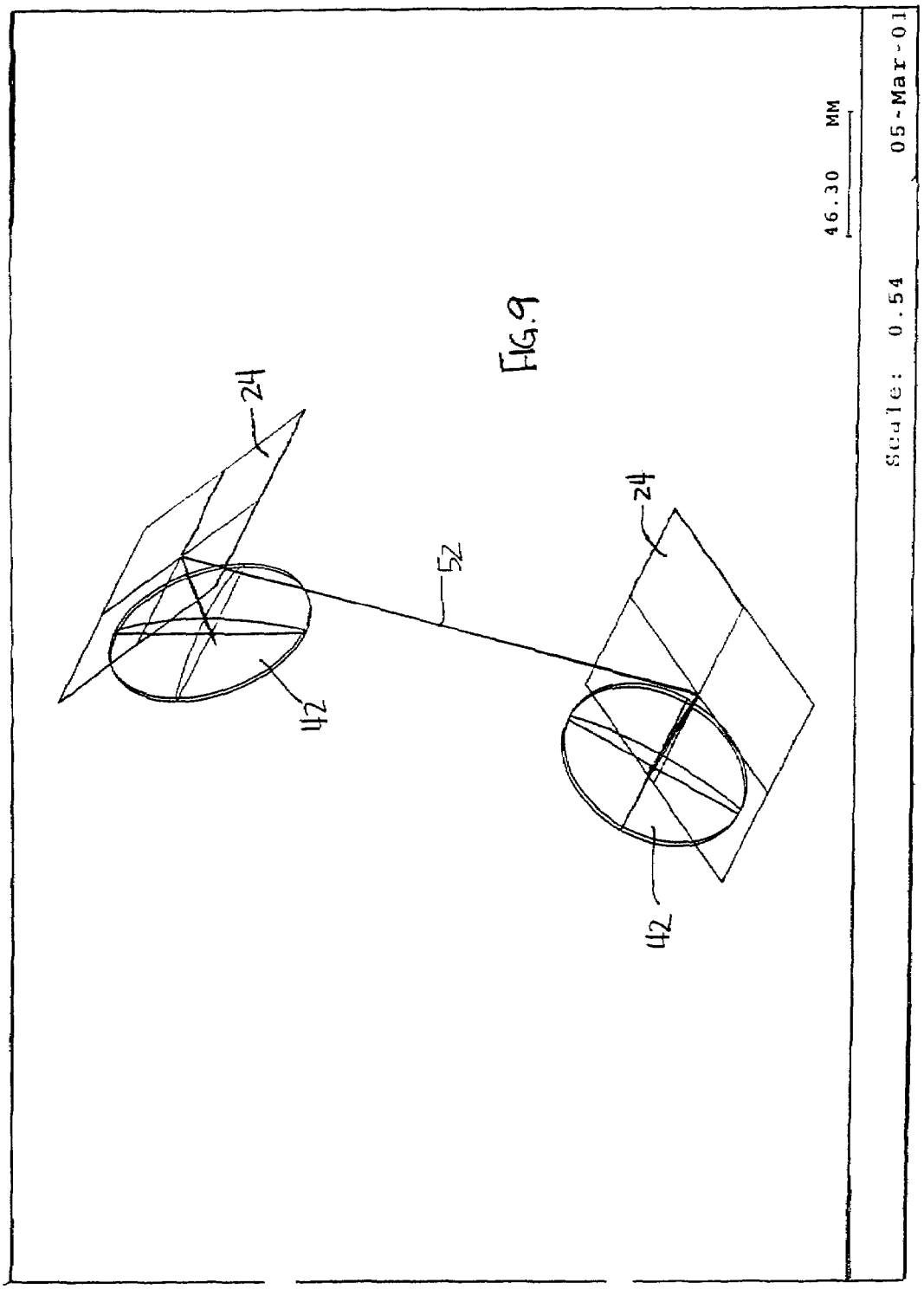
FIG. 9 is perspective view of the schematic configuration in FIG. 8.
Figure 10:
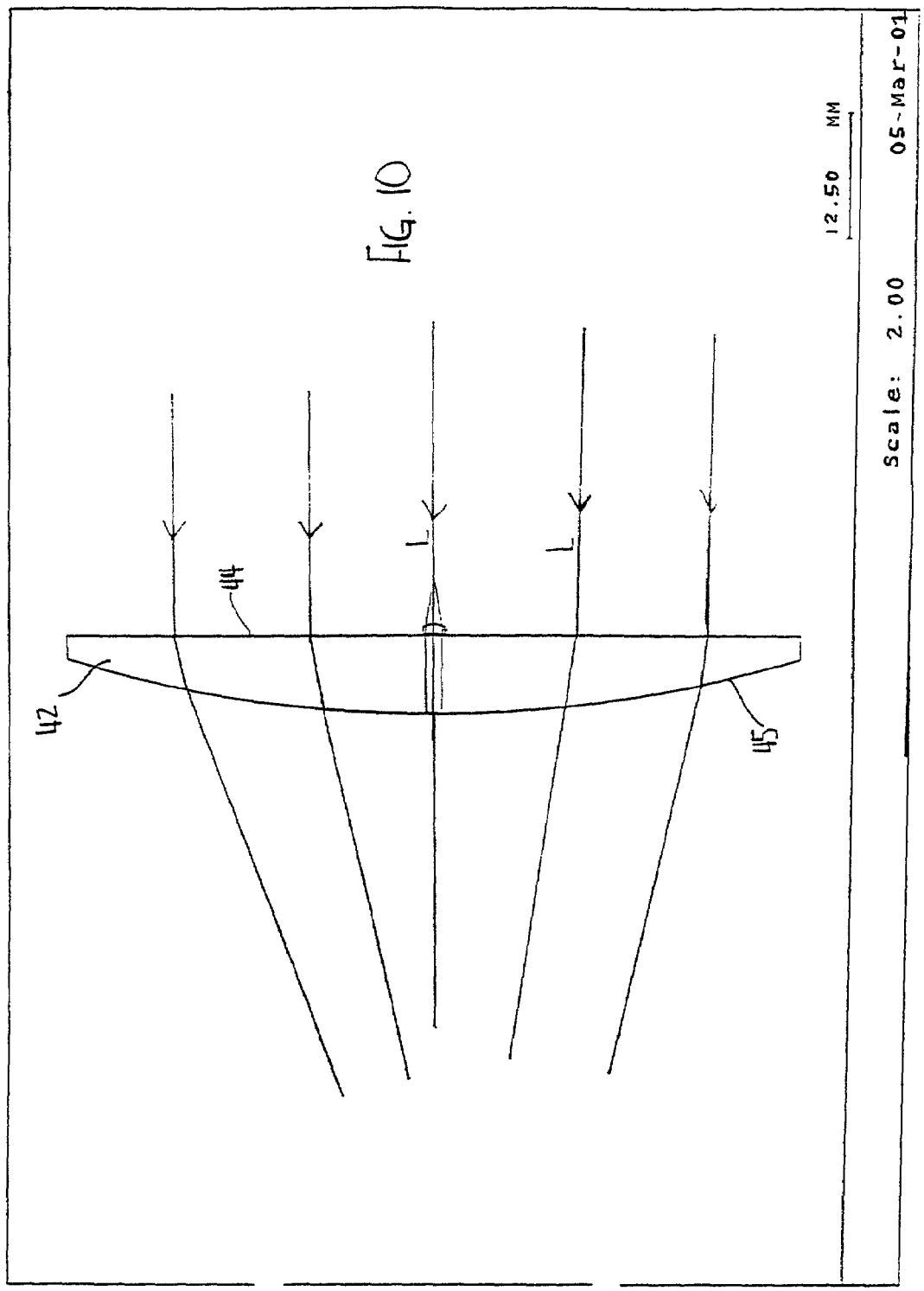
FIG. 10 is an enlarged side view of the plano-convex lens.

FIGS. 8–10 schematically illustrate the deployment of plano-convex lenses 42 in the subassemblies of the optical cross-connect. In these illustrations, some of the components of the cross-connect assembly are omitted for clarity, but they are equally applicable in these embodiments. The lens diameter is sufficiently large to cover the fiber/collimator assembly. The focal length of the lens is essentially equals to the sum of distance D between mirror arrays and the distance from the lens and the adjacent mirror array. Referring to FIG. 10, the convex face 45 of the lens 42 biases or refracts the light beams L to a point of convergence. In other words, the plano-convex lens 42 acts like a series of prisms, each acting on a beam. Similar to the discussion in connection with FIG. 7, all the light beams from the collimators are directionally pointed towards a convergence point that lies beyond the mirror surface. As in the earlier embodiments, the reflected convergence point is at or near the center of the target mirror array in the other subassembly.

Also seen in FIGS. 8 and 9 is a thinner section in the middle of the light beam, which is desirable for optimization of the optical coupling efficiency. When this thin section, or the "waist," of the Gaussian beam is in the middle of the path of the light beam, there is less optical loss. In other words, this configuration allows the maximum amount of light to be output to the mirror plate 24 from the input.

It is noted that the plano-convex lens 42 has little effect on focusing individual collimated beams (as opposed to biasing the bundle of light beams in a converging manner). According to another embodiment of the present invention, a slight divergence is provided in the light beam that enters the collimator, to compensate for any slight optical focusing effect of the lens. The slight divergence in the light will be offset by the focusing effect of the planar convex lens. In accordance with one embodiment of the present invention, the slight divergence in the light beam may be obtained by relative positioning of the optic fiber with respect to the optics of the collimator so that the light beam emerging from the optic fiber diverges slightly before entering the collimator.

In yet another aspect of the present invention, collimator-mounting sockets are provided in the collimator support plate to allow the collimators to swivel in aiming the collimators at the mirrors. In one embodiment illustrated in FIG. 5B, the sockets are axial symmetrical conical shaped through-holes 50 provided in the collimator plate 22, and the collimators 18 have a cylindrical external wall. The axes of the socket holes 50 are generally along a direction that converges at point P as disclosed above in relation to FIG. 7. The cylindrical wall of the collimators can swivel within the conical hole in directions about the axis of the holes. Once a collimator is aimed at the desired direction (i.e., at its associated mirror and in a converging direction as explained above), its position relative to the collimator plate is secured, for example by applying an epoxy, solder or laser welding.

In another embodiment illustrated in FIGS. 5C and 5D, the collimator plate 61 is machined to have a convex curved surface 55 as shown in 5D on the outward facing side (with respect to the mirror array). The curvature of the surface 55 may be defined to conform to a spherical surface having the convergent point 57 of the light beam from the collimator 18. Each hole 51 in the array is machined to have an axis along a radial axis or radius 59 from the convergent point 57. In general, if the surface 55 is spherical, the axis of each hole 51 would be oriented normal to the convex surface 51 at that point. In this embodiment, cylindrical holes 51, rather than conical holes 50 in the earlier embodiment, may be provided. Because this collimator plate 61 provides a convergent support structure in which collimators 18 can be bonded without the need for significant post placement alignments, it can reduce difficulties involved with such alignment procedures and thus reduce manufacturing times. For manufacturing processes that do not yield precisely tooled collimator plates, conically shaped collimator support holes may still be implemented in this embodiment to allow for alignment flexibility during manufacture of the switch assembly.

Figure 13:
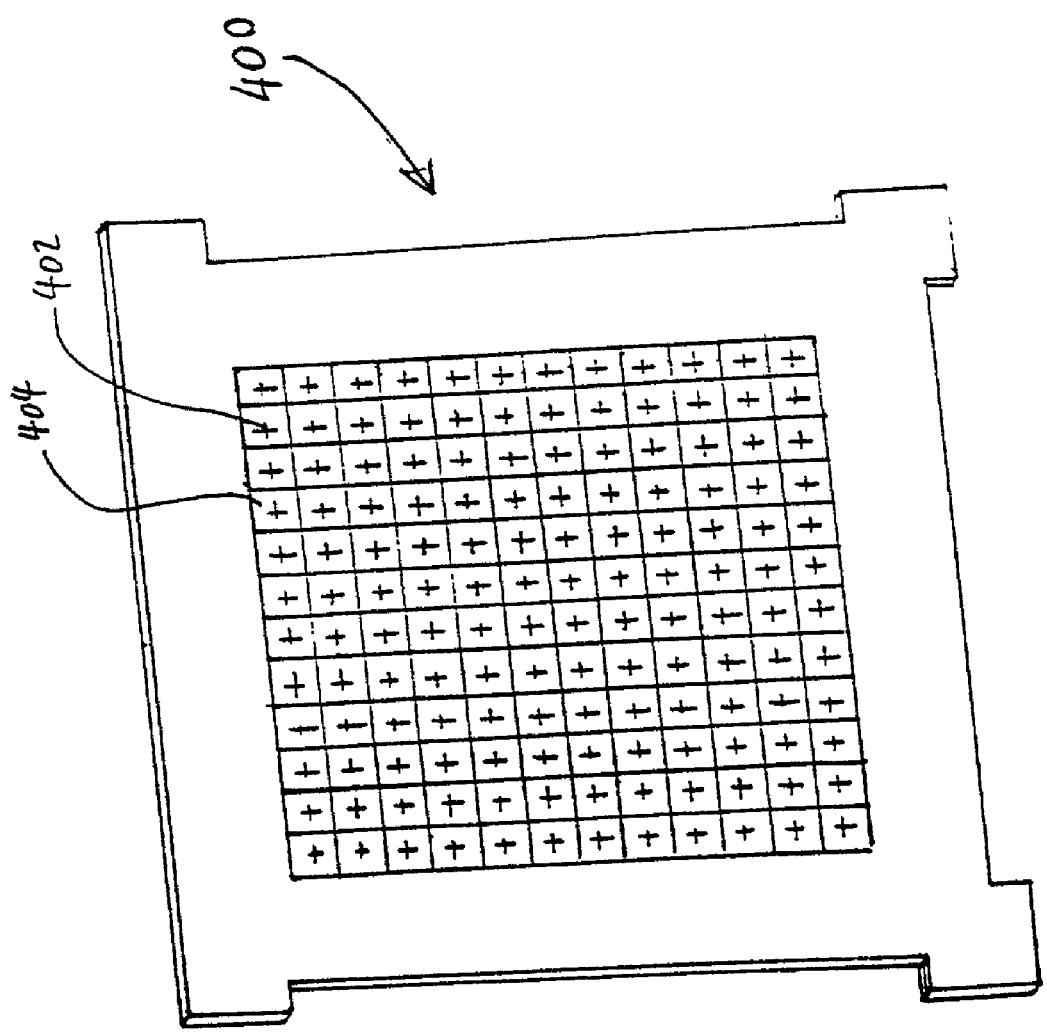
FIG. 13 is a perspective view of an alignment array plate in accordance with one embodiment of the present invention.

Referring to FIG. 13, the process of aiming/aligning the collimators 18 to the corresponding mirror is described. A MEMS "alignment array" plate 400 is fabricated which resembles the size and configuration of the mirror plate 24. An array of reflective alignment squares 404 having reflective surfaces at the same height (with respect to the configuration of the alignment array plate in an optical cross connect) as the mirrors 26 of a mirror plate 24 is provided on the alignment array plate 400, at the same locations and spacing as the mirrors 26 are positioned on the mirror plate 24. A cross-hair (+ or x-shaped) alignment marker 402 is etched in the center of each alignment squares 404 such that each marker 402 is highly dispersive/diffusing of incident light. Each marker 402 is appropriately sized so that the diameter of an incident collimated beam will be only slightly larger that the marker 402 (larger or smaller markers would work as well, it is easier to accomplish the alignment however when the beam and alignment marker are somewhat similar in dimension). To conduct the alignment process, the plate 400 and the collimator plate are assembled in an actual optical cross-connect or on a test bed (not shown) that resembles the setup of an optical cross-connect in which the collimator plate 24 will be deployed, with the mirror plate replaced by the plate 400. The individual collimators 18 are aimed against the alignment array in turn. An alignment technician can see the markers (e.g., using a CCD camera to magnify the view) when light beams are incident upon them from the collimators 18. Since the alignment markers have been precentered, beam alignment is accomplished when centered on the markers 402. After the position of a collimator 18 is aligned, it is secured by tacking with epoxy, spot welding or solder. It is understood that the planar configuration of the alignment array should always conform to the planar configuration of the mirrors on the mirror plate, if the mirror plate and/or the mirror array differ from the mirror plate 24.

According to another embodiment of the present invention in FIG. 11, there is provided a modified optical cross-connect assembly 110 in which the optical switch arrays are positioned with their planes at an acute angle to each other. Although the relative positioning of the collimator plates and mirror plates are different from the earlier embodiments, the underlying principles, features and functionality of the cross-connect system 10 remains the same for this embodiment. Like the earlier embodiment, the cross-connect assembly 110 comprises two identical subassemblies 111 and 112. Unlike the earlier embodiment, the subassemblies are not coupled in a symmetrical mirror-image fashion. The orientation of subassembly 111 is 180 degrees different from the orientation of the subassembly 112 in the plane of FIG. 11. Each subassembly may comprise similar collimator plate 22, optical switch plate 24, mirrors 26, fibers 14, collimators 18 and the other components of subassemblies 30 and 31. The relative positioning of the components may differ, depending on the optical geometry desired. The collimators 18 are supported on the collimator plates 22, aimed at the respective target (in this case, another mirror array) in a converging fashion at or near the center of the other mirror array, as illustrated by the dotted lines 113.

Figure 12:
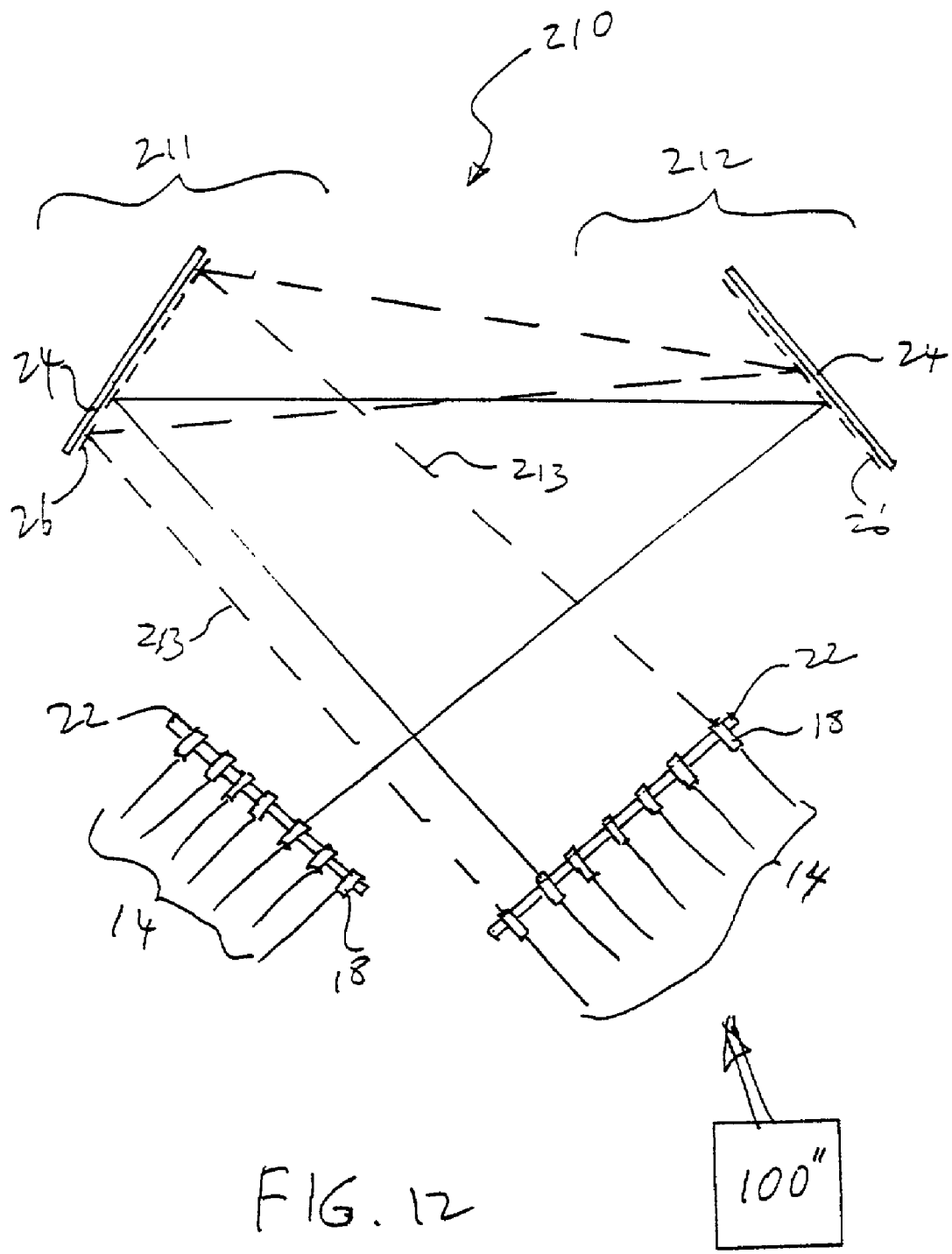
FIG. 12 is a schematic of the relative positioning of the collimator plates and mirror plates according to yet another embodiment of the present invention.

According to yet another embodiment of the present invention in FIG. 12, there is provided a modified optical cross-connect assembly 210 in which the optical switch arrays are positioned in a similar configuration as cross-connect assembly 10 shown in FIG. 7. However, the collimators 18 are targeted at the mirror arrays in a cross-path configuration as illustrated. Although the relative positioning of the collimator plates and mirror plates are different from the earlier embodiments, the underlying principles, features and functionality of the cross-connect system 10 remains the same for this embodiment. Like the earlier embodiment, the cross-connect assembly 210 comprises two identical subassemblies 211 and 212, coupled in a symmetrical mirror-image fashion. Each subassembly may comprise similar collimator plate 22, optical switch plate 24, mirrors 26, fibers 14, collimators 18 and the other components of subassemblies 30 and 31. The collimators 18 are supported on the collimator plates 22, aimed at the respective target (in this case, another mirror array) in a converging fashion at or near the center of the other mirror array, as illustrated by the dotted lines 213.

While the subassemblies in the foregoing embodiments are shown to be identical, it is within the scope and spirit of the present invention to deploy subassemblies of different configurations, sizes and shapes. For example, the subassemblies in a cross-connect assembly may have different switch arrays and corresponding collimator arrays of different sizes and geometries.

The relative positioning of the components in a cross-connect may differ, depending on the optical geometry desired. Further, in designing the cross-connect assemblies 10, 110 and 210, there are several design considerations that dictate the sizes and relative positioning of the components. These considerations may be inter-related, so that one may affect or limit another one or more parameter/factor. For example, as also noted above, the design considerations may include, without limitations:

(a) form factor of the optical switches/mirrors;
(b) rotation (angular displacement) limits of the mirrors (in the illustrated embodiment, the rotation is ±4.5° about two axes in the plane);
(c) the number of optical switches deployed in an array;
(d) any physical size limitation of the optical cross-connect assembly;
(e) the distance D between optical switch arrays;
(f) the angular configuration of the collimator plate 22 and switch plate 24;
(g) the convergence angle for the collimators; and
(h) the size of the target area to be covered by a mirror array.

Given the constraint of one or more parameters above, it could limit the value of the other parameters. For example, for a given mirror rotation limit and a desired optical switching capacity, the physical size of the cross-connects may be constrained to a certain minimum size. Conversely, given a physical size limitation, mirrors with a minimum rotation limit and/or limited array size may be required. The convergence angle of the collimators would depend in part on the distance D and the size of the mirror array. Given the disclosure of the present invention herein, it is within routine skill to obtain the optimum physical configuration of the components and cross-connect assembly given the design constraints.

A controller 100 is provided (see FIG. 2 and FIG. 11) to control the movements and positions of the switches 25 to direct light signals between the subassemblies 30 and 31, in synchronization with the input light signals and in accordance with the switching protocol adopted. The controller may include a feedback control system for mirror position and movement control, such as the dynamic analog feedback control system disclosed in the concurrently filed, co-pending U.S. Provisional Application No. 60/277,057, entitled "Distributive Optical Switching Control System", filed Mar. 18, 2001 in the names of Evans et. al, which is commonly assigned to Integrated Micromachines, Inc., the assignee of the present invention. This application is fully incorporated by reference herein. The controller may also include a calibration system for optical alignment of the optical switches 25 between the two subassemblies, such as the system disclosed in the Provisional Application No. 60/277,057, which had been fully incorporated by reference herein. The controls for the cross-connect assembly 10 may also include a scheme for optimizing the optical coupling between the subassemblies, such as the optimization schemes disclosed in the concurrently filed, co-pending U.S. Provisional Application No. 60/277,046, entitled "System And Method For Optimizing Optical Coupling In A Cross Connect Switch", filed Mar. 18, 2001 in the names of Bhat et. al, which is commonly assigned to Integrated Micromachines, Inc., the assignee of the present invention. This application is fully incorporated by reference herein.

Figure 14:
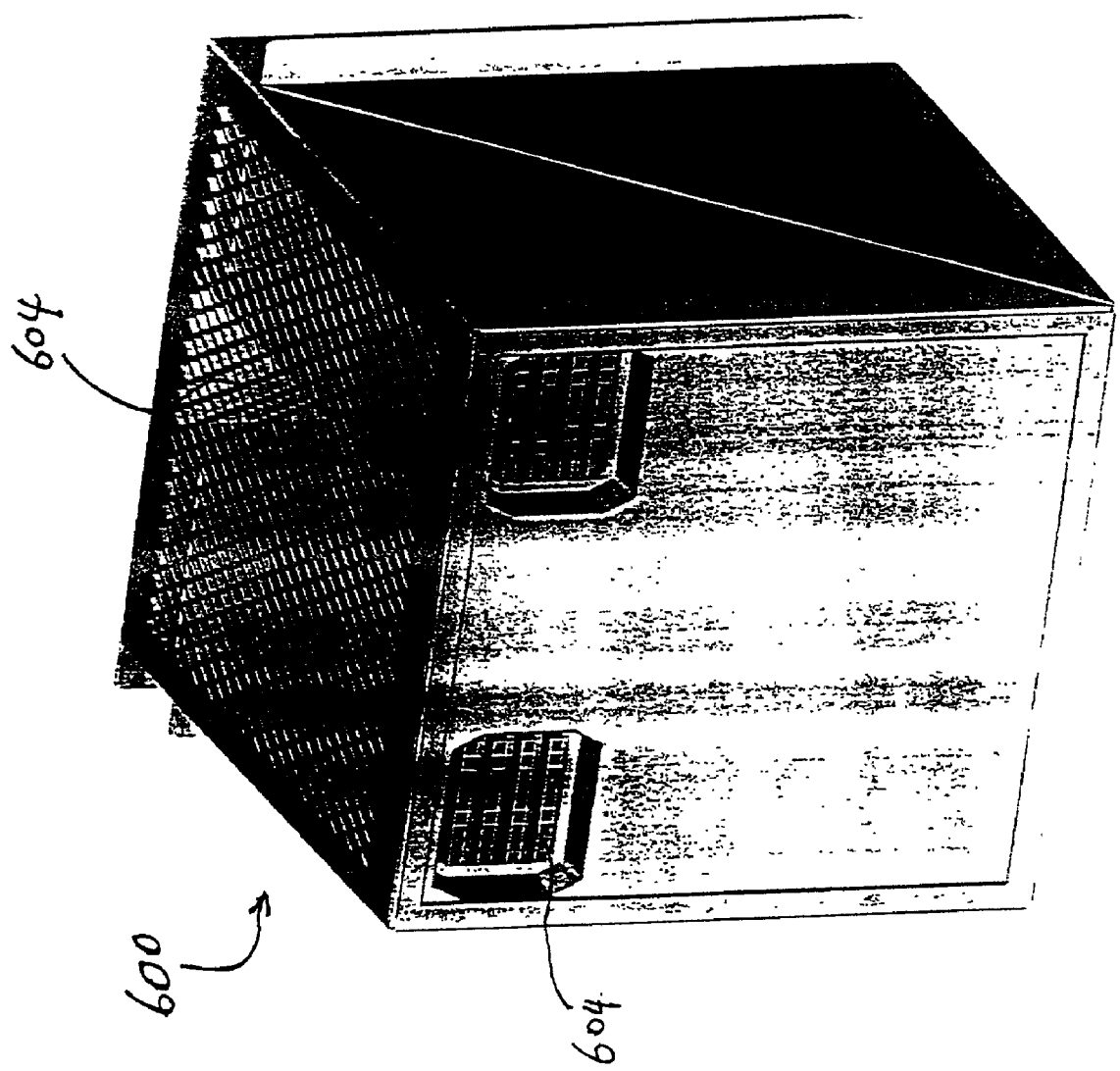
FIG. 14 is a rear perspective view of the casing for the optical cross-connect assembly modules in accordance with one embodiment of the present invention.
Figure 15:
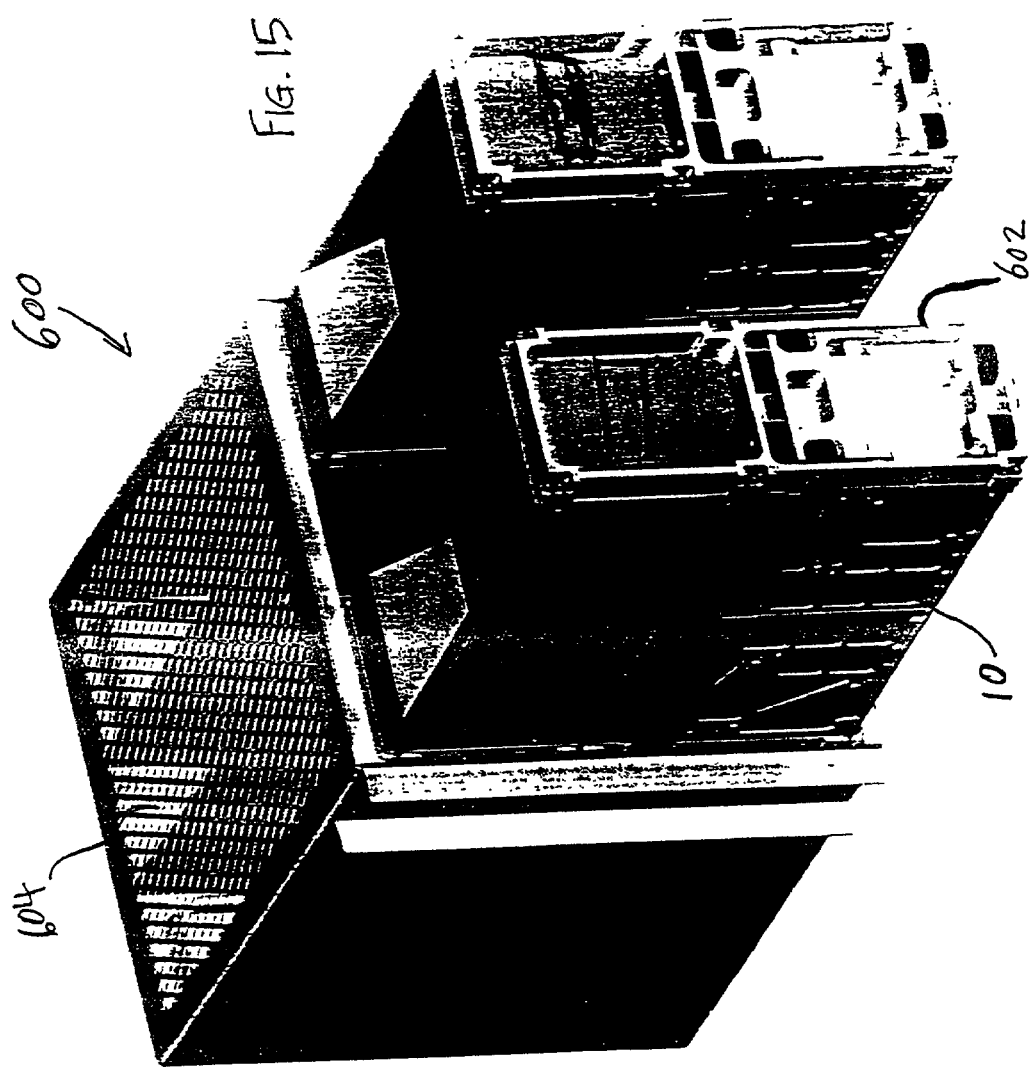
FIG. 15 is a front perspective view of the casing with the optical cross-connect assembly modules slid out.
Figure 16:
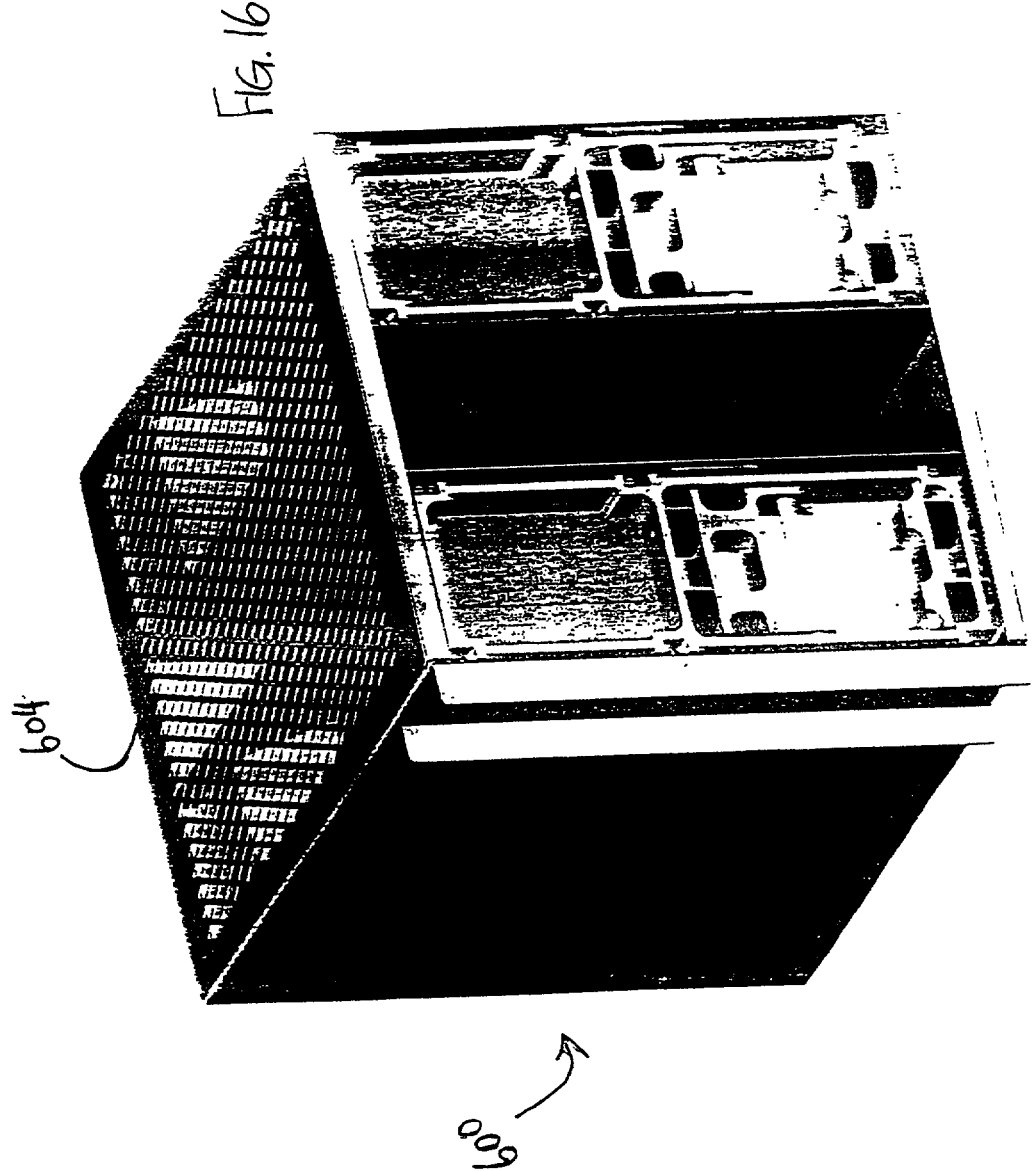
FIG. 16 is a front perspective view of the casing with the optical cross-connect assembly modules inserted therein.

In another aspect of the present invention, a modular support structure is designed for deployment of the cross-connect assemblies. FIGS. 14–16 illustrate a casing 600 for housing optical cross-connect assemblies, in accordance with one embodiment of the present invention. The optical cross-connect assemblies 10 are supported by a frame 602, which can slide in and out of the casing 600. Several cross-connect assemblies may be housed in a casing 600. In the particular embodiment illustrated, the casing 600 houses three cross-connect assemblies 10. The electronics in the assemblies 10 may be electrically interconnected to an external controller by connector/couplers (not shown) that make electrical connection when the frames 602 are fully inserted into the casing 600. The casing 600 is provided with ventilation holes 604. One or more casings 100 may be arranged, stacked, supported and secured on a rack (not shown) resembling an instrument rack. In a high capacity switching node in an optical network, several racks may be required to provide many banks of cross-connects. It can be appreciated that the present invention provides a convenient setup for accessing the cross-connect for servicing in the field.

While the present invention has been particularly shown and described with reference to the preferred embodiments, it will be understood by those skilled in the art that various changes in form and detail may be made without departing from the spirit, scope, and teaching of the invention. For example, the present inventive concepts are also applicable to cross-connects using mirrors using lesser degrees of freedom (i.e., single axis rotation). Further, the mirror surfaces may be coated or prepared with a color filtering/absorbent component, so that the mirrors would selectively direct light beams of a particular wavelength from the incident beams. For example, a mirror from the first mirror array (may or may not have a filter coating) may selectively direct a light beam to a mirror in the second mirror array having wavelength filtering coating, so that the output of the cross-connect assembly is a filtered light. In another embodiment, the cross-connect may be controlled to function as a variable optical attenuator. For example, the light beams may be directed from a first mirror to a second mirror but not in perfect alignment with the second mirror. Some of the light is attenuated at the second mirror due to misalignment.

Accordingly, the disclosed invention is to be considered merely as illustrative and limited in scope only as specified in the appended claims.

We claim:

1. An optical switching assembly, comprising:
   first and second arrays of optical switching elements, each having an optical reflective surface,
   first and second arrays of optical collimating elements, the first array of optical collimating elements directing optical rays at the first array of optical switching elements, wherein the first and second arrays of optical collimating elements and the first and second arrays of optical switching elements are positioned relative to one other in a configuration to permit optical rays from an optical collimating element in the first array of optical collimating elements to be directed to a targeted optical collimating element in the second array of optical collimating elements via the first and second arrays of optical switching elements;
   converging support aligning the first arrays of optical collimating elements with respect to the first array of optical switching elements such that optical paths of the optical rays from at least a plurality of the optical collimating elements in the first array of optical collimating elements are directed in a converging manner towards a common point in space behind the first array of optical switching elements.

2. The optical switching assembly as in claim 1, wherein the optical switching elements comprise moveable reflective surfaces.

3. The optical switching assembly as in claim 2, wherein the moveable reflective surfaces comprise a MEMS based mirror.

4. The optical switching assembly as in claim 1, wherein the optical collimating elements comprise a collimating lens.

5. The optical switching assembly as in claim 1, wherein each of the optical switching elements in the first array of optical switching elements is supported to be movable about at least one axis from a nominal position to one or more biased positions to direct optical rays at various switching elements in the second array of optical switching elements.

6. The optical switching assembly as in claim 5, wherein the second array of optical switching elements is positioned with respect to the first array of optical switching elements such that the optical rays reflected from incident rays from said plurality of the optical collimating elements in their nominal position directed at the first array of optical switching elements converge at a selected optical switching element in the second array of optical switching elements.

7. The optical switching assembly as in claim 6, wherein the selected optical switching element is located at or near center of the second array of switching elements.

8. The optical switching assembly as in claim 7 wherein the first and second arrays of optical switching elements are oriented in an oblique opposing manner with respect to each other such that all reflective surfaces from the first array of optical switching elements may be in an operative relationship to all reflective surfaces from the second array of optical switching elements.

9. The optical switching assembly as in claim 1, wherein the converging support comprises a first collimating element plate and a second collimating element plate, each containing an array of holes for aligning the optical collimating elements in the first and second arrays of optical collimating elements.

10. The optical switching assembly as in claim 9, wherein the array of holes is oriented in a substantially trapezoidal array.

11. The optical switching assembly as in claim 9, wherein the converging support aligns the second arrays of optical collimating elements such that optical paths of at least a plurality of the optical collimating elements in the second array of optical collimating elements are aimed in a converging manner towards a common point in space behind the second array of optical switching elements.

12. The optical switching assembly as in claim 9, wherein the first collimating element plate is fabricated to be convex in shape such that the collimating elements which are mounted in the holes of the first collimating element plate will be aimed to a common point in space on the opposite side of the first array of optical switching element.

13. The optical switching assembly as in claim 9, further comprising a first optical switch element support plate and second optical switch element support plate each holding a MEMS mirror array.

14. The optical switching assembly as in claim 13, further comprising a first top mounting plate and first bottom mounting plate for rigidly holding the first collimating element plate and first optical switch element support plate such that a desired oblique opposing orientation of the first collimating element plate and first optical switch element support plate is maintained as a first switch subassembly.

15. The optical switching assembly as in claim 14, further comprising a second top mounting plate and second bottom mounting plate for rigidly holding the second collimating element plate and second optical switch element support plate such that a desired oblique opposing orientation of the second collimating element plate and second optical switch element support plate is maintained as a second switch subassembly.

16. The optical switching assembly as in claim 15, further comprising a top joining plate and bottom joining plate whereby the first switch subassembly and second switch subassembly are joined to create a complete optical switch assembly.

17. The optical switching assembly as in claim 1, wherein the converging support comprises an optical element placed relative to the first array of collimating elements to converge paths of optical rays from the collimating elements of the first array of collimating element array towards the common point.

18. The optical switching assembly as in claim 17, wherein the optical element comprises a plano-convex lens.

19. The optical switching assembly as in claim 1, wherein the distance along the optical axis between the first array of collimating elements and the common point in space is substantially equal to the distance along the optical axis between the first array of collimating elements and a switching element at or near the center of the second array of switching elements via the first array of switching elements.

20. In an optical switching assembly that comprises first and second arrays of optical switching elements, each having an optical reflective surface; first and second arrays of optical collimating elements, the first array of optical collimating elements directing optical rays at the first array of optical switching elements, wherein the first and second arrays of optical collimating elements and the first and second arrays of optical switching elements are positioned relative to one other in a configuration to permit optical rays from an optical collimating element in the first array of optical collimating elements to be directed to a targeted optical collimating element in the second array of optical collimating elements via the first and second arrays of optical switching elements; a method of aligning optical rays comprising the steps of:

aligning optical rays from the first array of optical collimating elements with respect to the first array of optical switching elements such that optical paths of the optical rays from at least a plurality of optical collimating elements in the first array of optical collimating elements are directed in a converging manner towards a common point in space behind the first array of optical switching elements.

21. An optical switching assembly for directing optical rays at a target surface, comprising:

a first array of optical switching elements, each having an optical reflective surface, a first array of optical collimating elements, the first array of optical switching elements directing optical rays at the first array of optical switching elements, wherein the first array of optical collimating elements and the first array of optical switching elements are positioned relative to one other in a configuration to permit optical rays from an optical collimating element in the first array of optical collimating elements to be directed to a targeted point on the target surface via the first and second arrays of optical switching elements;

converging support aligning a plurality of the optical collimating elements in the first array of optical collimating elements with respect to the first array of optical switching elements such that optical paths of the optical rays from said plurality of optical collimating elements are directed in a converging manner towards a common point in space behind the first array of optical switching elements.

* * * * *